(12) United States Patent
Sarfraz

(10) Patent No.: US 11,756,313 B2
(45) Date of Patent: Sep. 12, 2023

(54) ROAD-PERCEPTION SYSTEM CONFIGURED TO ESTIMATE A BELIEF AND PLAUSIBILITY OF LANES IN A ROAD MODEL

(71) Applicant: Aptiv Technologies Limited, St. Michael (BB)

(72) Inventor: Sana Sarfraz, Agoura Hills, CA (US)

(73) Assignee: Aptiv Technologies Limited, St. Michael (BB)

( * ) Notice: Subject to any disclaimer, the term of this patent is extended or adjusted under 35 U.S.C. 154(b) by 456 days.

(21) Appl. No.: 17/037,392

(22) Filed: Sep. 29, 2020

(65) Prior Publication Data

US 2022/0101023 A1    Mar. 31, 2022

(51) Int. Cl.
   *G06V 20/56* (2022.01)
   *G05D 1/00* (2006.01)
   *G06F 18/21* (2023.01)

(52) U.S. Cl.
   CPC ......... *G06V 20/588* (2022.01); *G05D 1/0088* (2013.01); *G06F 18/217* (2023.01); *G05D 2201/0213* (2013.01)

(58) Field of Classification Search
   CPC .............. G06V 20/588; G05D 1/0088; G05D 2201/0213; G06F 18/217
   See application file for complete search history.

(56) References Cited

U.S. PATENT DOCUMENTS

| 2008/0249706 | A1  | 10/2008 | Bradai et al. |
| 2010/0076920 | A1  | 3/2010 | Johnson et al. |
| 2017/0016740 | A1* | 1/2017 | Cui .................. G01C 21/30 |

FOREIGN PATENT DOCUMENTS

DE    102017207790 A1    11/2018

OTHER PUBLICATIONS

"A High-Level Road Model Information Fusion Framework and its Application to Multi-Lane Speed Limit Inference" M.Schreier et al., 2017 IEEE Intelligent Vehicles Symposium (IV) Jun. 11-14, 2017, Redondo Beach, CA, USA (Year: 2017).*
"Evidential Multisensor Fusion and Erroneous Management of Lanes for Autonomous Driving" S. Moujtahid et al., 2019 IEEE Sensors Applications Symposium (SAS) (pp. 1-6) (Year: 2019).*

(Continued)

*Primary Examiner* — Peter D Nolan
*Assistant Examiner* — Tanya C Sienko
(74) *Attorney, Agent, or Firm* — Sawtooth Patent Group PLLC

(57) ABSTRACT

This document describes techniques and systems for a road-perception system to estimate a belief and plausibility of lanes in a road model. The road-perception system models lanes of a road using basis bands to represent lane sections. The basis bands comprise points representing a polyline with a width at each point. The use of basis bands results in lower-computational requirements and a more stable road model than grid-based representations of a driving environment. The road-perception system also determines a belief mass associated with the lane sections. The road-perception system then computes, using the belief masses, a belief parameter and a plausibility parameter associated with proposed lanes of the road model. In this way, the described techniques and systems can provide an accurate and reliable road model and quantify uncertainty therein.

20 Claims, 7 Drawing Sheets

(56) References Cited

OTHER PUBLICATIONS

"DAGMapper: Learning to Map by Discovering Lane Topology" N. Homayounfar et al., 2019 IEEE/CVF International Conference on Computer Vision (ICCV) (Year: 2019).*

"Efficient Scene Understanding for Intelligent Vehicles Using a Part-Based Road Representation" D. Toepfer et al., Proceedings of the 16th International IEEE Annual Conference on Intelligent Transportation Systems (ITSC 2013), The Hague, The Netherlands, Oct. 6-9, 2013 (Year: 2013).*

"Extended European Search Report", EP Application No. 21191288.6, dated Feb. 7, 2022, 9 pages.

Schreier, et al., "A High-Level Road Model Information Fusion Framework and its Application to Multi-Lane Speed Limit Inference", Jun. 2017, pp. 1201-1208.

"United State Pavement Markings", Retrieved at: https://mutcd.fhwa.dot.gov/services/publications/fhwaop02090/uspavementmarkings.pdf—on Nov. 10, 2020, 9 pages.

"United States Road Symbol Signs", Retrieved at: https://mutcd.fhwa.dot.gov/services/publications/fhwaop02084/ us_road_symbol_signs.pdf—on Nov. 10, 2020, 9 pages.

Sahir, "Canny Edge Detection Step by Step in Python—Computer Vision", Jan. 25, 2019, 18 pages.

Steyer, et al., "Grid-Based Environment Estimation Using Evidential Mapping and Particle Tracking", Jun. 2018, 13 pages.

Thomas, et al., "Sensor-based road model estimation for autonomous driving", Jun. 2017, pp. 1764-1769.

"Curvature of a 1D curve in a 2D or 3D space—MathWorks", Retrieved at: https://www.mathworks.com/matlabcentral/fileexchange/69452-curvature-of-a-1d-curve-in-a-2d-or-3d-space—on Nov. 10, 2020, 4 pages.

"Dempster-Shafer theory—Wikipedia", Retrieved at: https://en.wikipedia.org/wiki/Dempster-Shafer_theory—On Mar. 24, 2020, 12 pages.

"Menger curvature—Wikipedia", Retrieved at: https://en.wikipedia.org/wiki/Menger_curvature—on Nov. 10, 2020, Nov. 9, 2020, 3 pages.

Dierkes, et al., "Corridor Selection Under Semantic Uncertainty for Autonomous Road Vehicles", Nov. 2018, pp. 505-512.

Dierkes, et al., "Towards a Multi-Hypothesis Road Representation for Automated Driving", Sep. 2015, 8 pages.

Ganji, et al., "Road Safety Evaluation using a Novel Cross Efficiency Method based on Double Frontiers DEA and Evidential Reasoning Approach", Dec. 2017, 16 pages.

Huang, "Lane Estimation for Autonomous Vehicles using Vision and LIDAR", PhD Thesis, MIT, Feb. 2010, 114 pages.

Mehrannia, et al., "A Dempster-Shafer Sensor Fusion Approach for Traffic Incident Detection and Localization", 21st International Conference on Intelligent Transportation Systems (ITSC), Nov. 2018, pp. 3911-3916.

Moujtahid, et al., "Evidential Multisensor Fusion and Erroneous Management of Lanes for Autonomous Driving", 2019 IEEE Sensors Applications Symposium (SAS), Mar. 2019, 6 pages.

Nassreddine, et al., "Map matching algorithm using interval analysis and Dempster-Shafer theory", Jul. 2009, 6 pages.

Qin, et al., "Detecting Anomalous Trajectories Using the Dempster-Shafer Evidence Theory Considering Trajectory Features from Taxi GNSS Data", Oct. 2018, 25 pages.

Szucs, "Route planning with uncertain information using Dempster-Shafer theory", International Conference on Management and Service Science, Oct. 2009, 4 pages.

Thomas, et al., "Grid-based Online Road Model Estimation for Advanced Driver Assistance Systems", Jun. 2015, p. 71-76.

Thomas, et al., "Semantic Grid-Based Road Model Estimation for Autonomous Driving", Jun. 2019, 8 pages.

Topfer, et al., "Efficient Road Scene Understanding for Intelligent Vehicles Using Compositional Hierarchical Models", May 2015, 10 pages.

Uzer, et al., "Dempster Shafer Grid-based Hybrid Fusion of Virtual Lanes for Autonomous Driving", Nov. 2019, pp. 3760-3765.

"Extended European Search Report", EP Application No. 21218427.9, dated Jun. 15, 2022, 10 pages.

Kurdej, et al., "Map-Aided Evidential Grids for Driving Scene Understanding", Apr. 2015, pp. 30-41.

Martin, et al., "General Combination Rules for Qualitative and Quantitative Beliefs", Jun. 28, 2009, 38 pages.

Nguyen, et al., "A General Reliability-Aware Fusion Concept Using DST and Supervised Learning with Its Applications in Multi-Source Road Estimation", 2018 IEEE Intelligent Vehicles Symposium (IV), 2018, 8 pages.

Puthon, et al., "A Complete System to Determine the Speed Limit by Fusing a GIS and a Camera", Oct. 5, 2011, pp. 1686-1691.

Schubert, "Constructing and Reasoning about Alternative Frames of Discernment", Proceedings of the Workshop on the Theory of Belief Functions, Apr. 2010, 6 pages.

Yu, et al., "Lane Recognition Based on Location of Raised Pavement Markers", 2011 IEEE Intelligent Vehicles Symposium (IV), 2011, pp. 1013-1018.

Töpfer, et al., "Efficient Scene Understanding for Intelligent Vehicles Using a Part-Based Road Representation", Proceeding of the 16th International IEEE Annual Conference on Intelligent Transportation Systems, Oct. 2013, 6 pages.

* cited by examiner

ROAD-PERCEPTION SYSTEM CONFIGURED TO ESTIMATE A BELIEF AND PLAUSIBILITY OF LANES IN A ROAD MODEL

BACKGROUND

Road-perception systems can provide driving systems with information about road conditions and road geometry (e.g., for controlling an automobile on a roadway). Vehicles can use road-perception systems for a variety of assisted-driving systems and autonomous-driving systems, including Automatic Cruise Control (ACC), Traffic-Jam Assist (TJA), Lane-Centering Assist (LCA), and L3/L4 Autonomous Driving on Highways (L3/L4). Some safety regulations require such driving systems, including L3/L4 systems, to model lanes of the road and quantify an uncertainty associated with the road model. Existing road-perception systems are often inaccurate or unreliable and cannot quantify uncertainty to satisfy such regulations.

SUMMARY

This document describes techniques and systems for a road-perception system configured to estimate a belief and plausibility of lanes in a road model. For example, this document describes a road-perception system configured to define lane sections, which make up portions of lanes in a road. The lane sections are represented by basis bands that include points of a polyline and a width at the points of the polyline. The road-perception system determines respective belief masses associated with the lane sections. The road-perception system also consolidates the lane sections into a set of proposed lanes. The road-perception system then determines, using the respective belief masses associated with the lane sections, a belief parameter and a plausibility parameter associated with each lane of the set of proposed lanes. The road-perception system also determines the difference between the plausibility parameter and belief parameter, which difference represents the ignorance in the estimate. The described techniques and systems then determine whether the belief parameter, the plausibility parameter, and the difference between the plausibility parameter and the belief parameter associated with each lane of the set of proposed lanes are each greater or less than a respective threshold value. Responsive to a determination that the belief parameter and the plausibility parameter are each greater than the respective threshold value and the difference between the plausibility parameter and belief parameter is lower than the respective threshold value, an autonomous-driving system or an assisted-driving system operates the vehicle using the set of proposed lanes.

This document also describes other operations of the above-summarized system and other methods set forth herein, as well as means for performing these methods.

This Summary introduces simplified concepts for a road-perception system configured to estimate a belief and plausibility of lanes in a road model, which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a road-perception system configured to estimate a belief and plausibility of lanes in a road model are described in this document with reference to the following figures. The same numbers are used throughout the drawings to reference like features and components.

DETAILED DESCRIPTION

Overview

Figure 1:
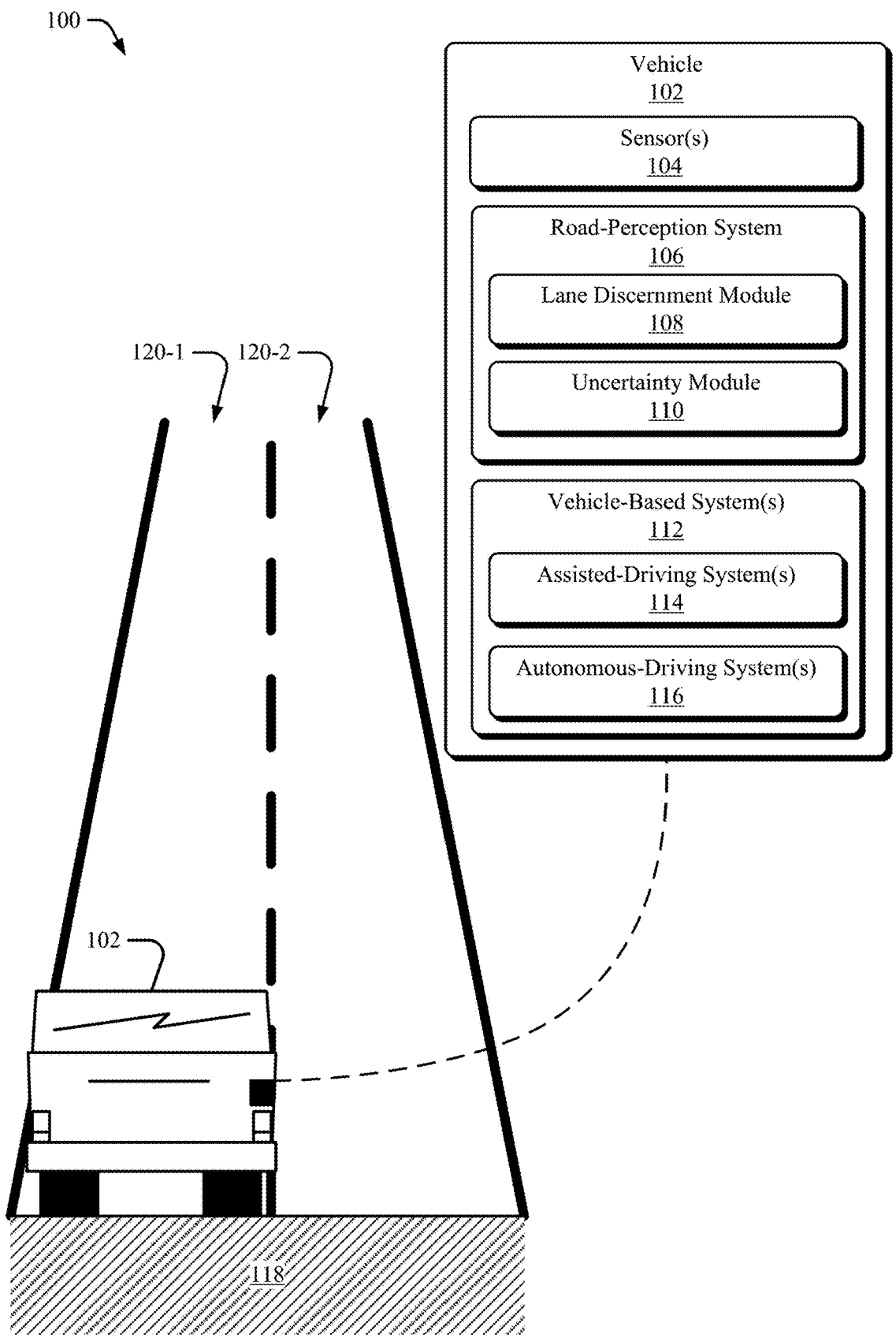
FIG. 1 illustrates an example environment in which a road-perception system that estimates a belief and plausibility of lanes in a road model can be implemented.

Road-perception systems are an important technology for assisted-driving and autonomous-driving systems. Some driving systems (e.g., L3/L4 systems) and some safety regulations (e.g., Safety of the Intended Functionality (SOTIF) of a system (ISO/PAS 21448:2019 "Road vehicles—Safety of the intended functionality")) require a road-perception system not only to model the lanes of a road, but also to quantify uncertainty in the model and maintain one or more lane hypotheses.

Some road-perception systems define a road as any street, avenue, roadway, expressway, highway, driveway, ramp, alley, or other path for an automobile, and further define the road as a set of lanes with each lane represented as a set of boundaries. These systems, however, generally identify lanes by dividing the road into markers, sidewalks, and obstacles and associating these components into a road model. These systems often also use an occupancy grid for their road models, which can require considerable computational requirements. Systems with tighter computational budgets often represent lanes as clothoids or cubic polynomials. Such simple parametric representation of lanes generally does not accurately represent the lane shapes over longer distances and can introduce issues, particularly in fusion with map data.

In contrast, this document describes computationally-inexpensive and accurate road-perception techniques and systems to estimate a belief and plausibility of lanes in a road model. For example, the described road-perception techniques and systems can define lanes in a road model and quantify the uncertainty associated with the lanes. The described road-perception system uses basis bands, which include points representing a polyline with a width at each point, to define lane sections. The basis bands require fewer computational requirements, compared to occupancy grids, and provide a more accurate parametric representation compared to clothoids or cubic polynomials. In this way, road modeling is simplified without requiring the road to be partitioned into markers, sidewalks, and obstacles, for a grid-based representation, and without oversimplifying it into a polynomial representation.

The described techniques and systems also determine a belief mass associated with the lane sections. The described road-perception system consolidates the lane sections into a set of proposed lanes. The road-perception system can determine, using the belief masses associated with the lane sections, a belief parameter and a plausibility parameter associated with the proposed lanes. In this way, the described techniques and systems can quantify uncertainty in the road model and better fulfil the SOTIF requirements for L3/L4 systems. The described techniques and systems can also scale down to other autonomous-driving or assisted-driving systems with fewer sensors or different sensor configurations.

This section describes just one example of how the described techniques and systems can estimate a belief and plausibility of lanes in a road model. This document describes other examples and implementations.

Operating Environment

FIG. 1 illustrates an example environment 100 in which a road-perception system 106 that can estimate a belief and plausibility of lanes 120 in a road model can be implemented. In the depicted environment 100, the road-perception system 106 is mounted to, or integrated within, a vehicle 102. The vehicle 102 can travel on a road 118, which includes lanes 120 (e.g., a first lane 120-1, a second lane 120-2). In this implementation, the vehicle 102 is traveling in the first lane 120-1.

The road-perception system 106 can estimate a belief parameter and a plausibility parameter of the lanes 120 of a road model. Although illustrated as a car, the vehicle 102 can represent other types of motorized vehicles (e.g., a motorcycle, a bus, a tractor, a semi-trailer truck, or construction equipment). In general, manufacturers can mount the road-perception system 106 to any moving platform that can travel on the road 118.

In the depicted implementation, a portion of the road-perception system 106 is mounted into a rear-view mirror of the vehicle 102 to have a field-of-view of the road 118. The road-perception system 106 can project the field-of-view from any exterior surface of the vehicle 102. For example, vehicle manufacturers can integrate at least a part of the road-perception system 106 into a side mirror, bumper, roof, or any other interior or exterior location where the field-of-view includes the road 118. In general, vehicle manufacturers can design the location of the road-perception system 106 to provide a particular field-of-view that sufficiently encompasses the road 118 on which the vehicle 102 may be traveling.

The vehicle 102 also includes one or more vehicle-based systems 112 that use data from the road-perception system 106. The vehicle-based systems can include an assisted-driving system 114 and an autonomous-driving system 116. Generally, the vehicle-based systems 112 use the road-perception data provided by the road-perception system 106 to perform a function. For example, the assisted-driving system 114 can provide automatic cruise control and monitor for the presence of an object (as detected by another system on the vehicle 102) in the first lane 120-1, in which the vehicle 102 is traveling. In this example, the road-perception data from the road-perception system 106 identifies the lanes 120. As another example, the assisted-driving system 114 can provide alerts when the vehicle 102 crosses a lane marker for the first lane 120-1.

The autonomous-driving system 116 may move the vehicle 102 to a particular location on the road 118 while avoiding collisions with objects detected by other systems (e.g., a radar system, a lidar system) on the vehicle 102. The road-perception data provided by the road-perception system 106 can provide information about the location of the lanes 120 and uncertainty in the location of the lanes 120 to enable the autonomous-driving system 116 to perform a lane change or steer the vehicle 102.

The vehicle also includes one or more sensors 104 to provide input data to one or more processors. The sensors 104 can include a camera, a radar system, a global positioning system (GPS), a lidar system, or any combination thereof. A camera can take photographic images or video of the road 118. A radar system or a lidar system can use electromagnetic signals to detect objects in the road 118. A GPS can determine a position and/or navigation of the vehicle 102.

The road-perception system 106 includes a lane discernment module 108 and an uncertainty module 110. The lane discernment module 108 can determine a topology of the road 118, along with the lanes 120, as represented by a collection of lane sections. The lane discernment module 108 can also compute an uncertainty associated with each lane section.

The uncertainty module 110 can consolidate the lane sections into a set of proposed lanes in a road model. In some cases, the uncertainty module 110 can identify multiple lane hypotheses of the lanes 120. The uncertainty module 110 can also, using the uncertainty associated with each lane section, estimate a belief (e.g., likelihood) and a plausibility (e.g., confidence) associated with each lane 120 of the road model or the one or more lane hypotheses. This document describes the components and operations of the road-perception system 106 in greater detail with respect to FIG. 2.

Figure 2:
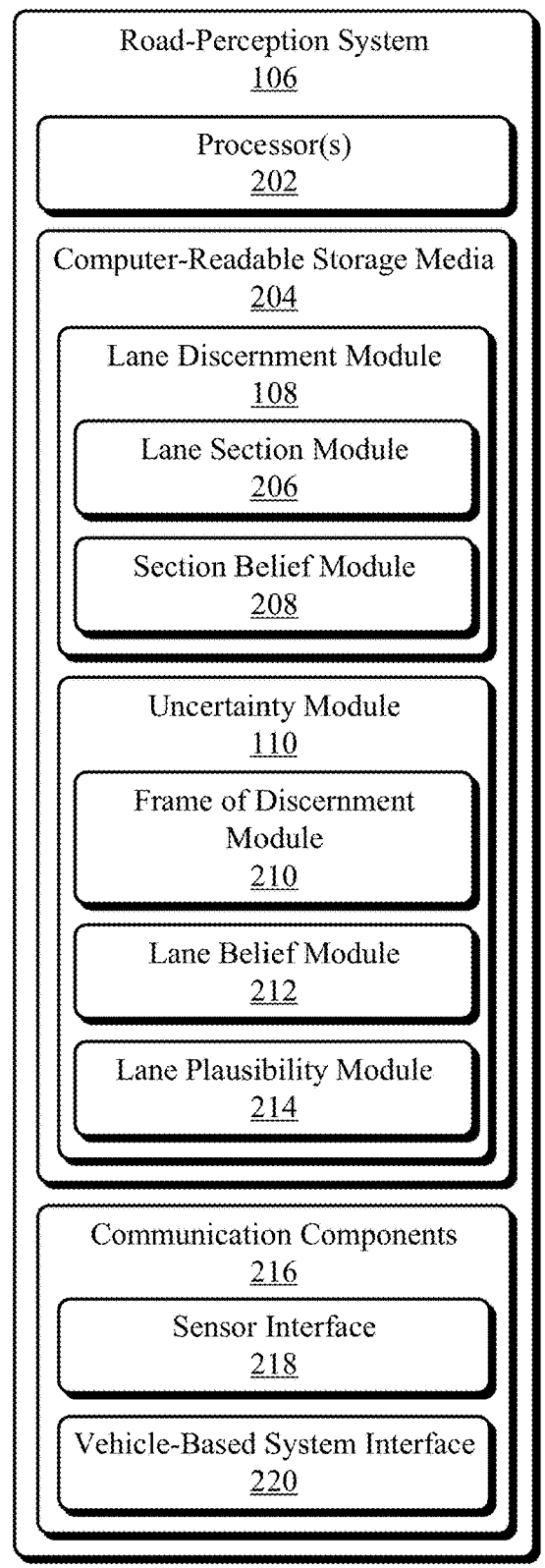
FIG. 2 illustrates an example configuration of a road-perception system.

FIG. 2 illustrates an example configuration of the road-perception system 106. The road-perception system 106 can include one or more processors 202, computer-readable storage media (CRM) 204, and communication components 216.

The processor 202 can be a microprocessor or a system-on-chip of a computing device. The processor 202 executes computer-executable instructions stored within the CRM 204. As an example, the processor 202 can execute the lane discernment module 108 to define lane sections of the road 118 and determine an uncertainty associated with the lane sections. Similarly, the processor 202 can execute the uncertainty module 110 to consolidate the lane sections into a road model and estimate a belief parameter and a plausibility parameter associated with the lanes 120 of the road model. The processor 202 can also generate road-perception data for the vehicle-based systems 112.

The lane discernment module 108 can include a lane section module 206 and a section belief module 208. The lane section module 206 can determine lane sections of the road 118 by, for example, extracting them from a high-definition map stored in the CRM 204 and/or tracking them using data from the sensors 104. The lane section module 206 can define each lane section as a basis band, which represents a multivariate normal distribution over a set of points with a width at each point. In this way, the lane section module 206 represents the lane sections as a centerline with equal margins on each side of the centerline. The lane section module 206 can also generate a directed acyclic graph of the lane sections. The acyclic graph is generated to aid in ordering a set of lane sections determined by the lane section module 206 into parent and child nodes for computationally efficient processing. The lane discernment module 108 relies on the section belief module 208 to estimate a belief mass associated with each lane section identified by the lane section module 206.

The uncertainty module 110 can include a frame of discernment module (FOD) 210, a lane belief module 212, and a lane plausibility module 214. The FOD module 210 can group, based on the directed acyclic graph generated by the lane section module 206 and the Dempster Shafer Theorem, the lane sections into one or more lane hypotheses. The Dempster Shafer Theorem provides a framework for reasoning about a set of hypotheses that are subject to uncertainty. The Dempster Shafer Theorem is a generalization of Bayesian probability theory that accounts for lack of evidence or ignorance when estimating the likelihood of a hypothesis being true. The generation of the lane hypotheses is described in greater detail with respect to FIG. 5.

The lane belief module 212 can combine the belief masses of the lane sections into an estimate of a belief parameter associated with each lane 120 identified by the FOD module 210. The lane plausibility module 214 can use the belief masses of the lane sections to estimate a plausibility parameter associated with each lane 120. The uncertainty module 110 can determine the difference between the plausibility parameter and the belief parameter, which difference represents the ignorance in the lane hypothesis.

The communication components 216 can include a sensor interface 218 and a vehicle-based system interface 220. The sensor interface 218 and the vehicle-based system interface 220 can transmit the data over a communication bus of the vehicle 102, for example, when the individual components of the road-perception system 106 are integrated within the vehicle 102.

The processor 202 can receive, via the sensor interface 218, measurement data from the one or more sensors 104 as input to the road-perception system 106. As an example, the processor 202 can receive image data or video data from a camera via the sensor interface 218. Similarly, the processor 202 can send, via the sensor interface 218, configuration data or requests to the one or more sensors 104.

The vehicle-based system interface 220 can transmit road-perception data to the vehicle-based systems 112 or another component of the vehicle 102. In general, the road-perception data provided by the vehicle-based system interface 220 is in a format usable by the vehicle-based systems 112. In some implementations, the vehicle-based system interface 220 can send information to the road-perception system 106, including, as a non-limiting example, the speed of the vehicle 102. The road-perception system 106 can use this information to configure itself appropriately. For example, the road-perception system 106 can adjust, via the sensor interface 218, a frame rate or scanning speed of one or more sensors 104 based on the speed of the vehicle 102.

Figure 3:
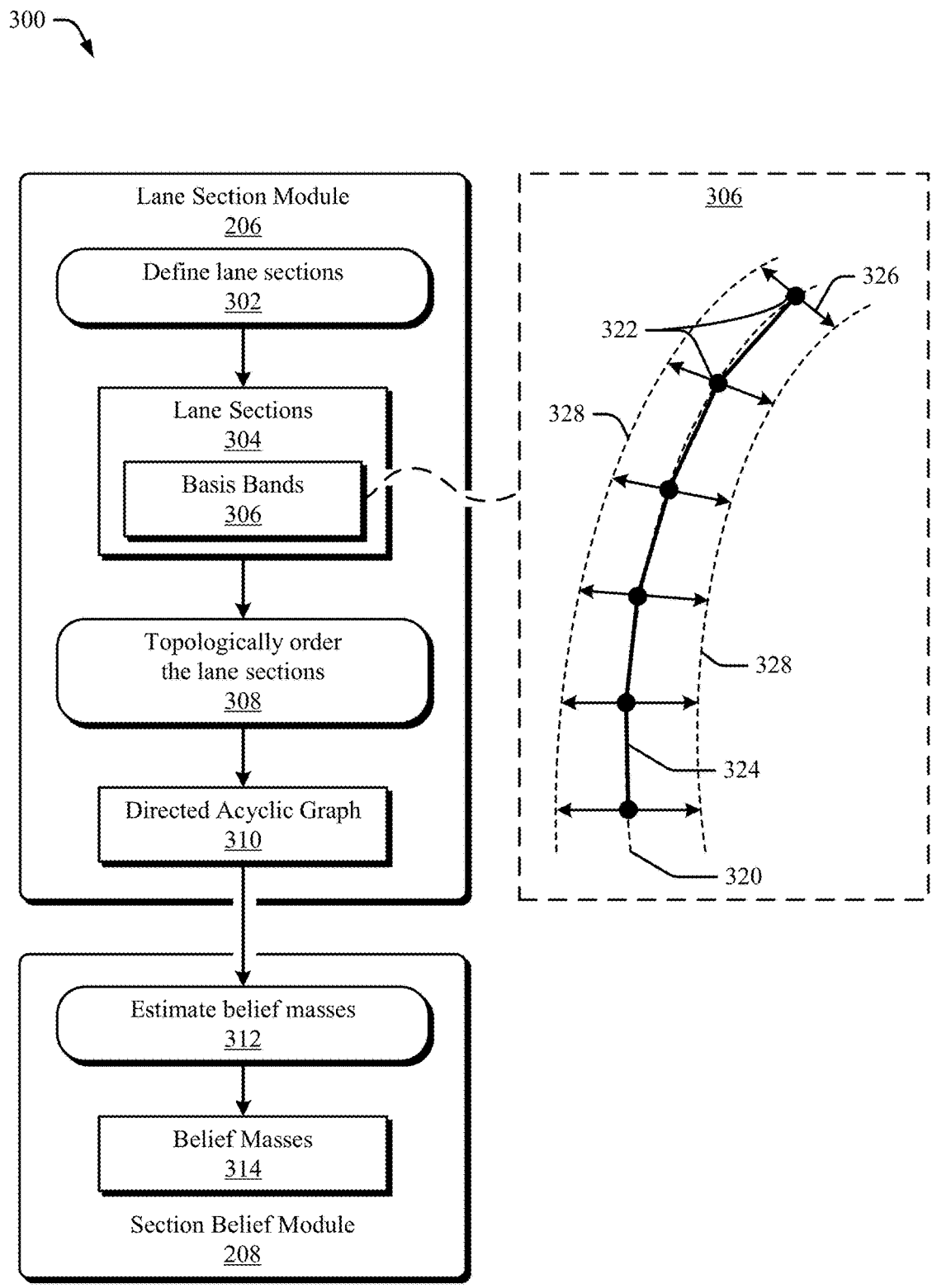
FIG. 3 illustrates an example flowchart of a road-perception system configured to define one or more lane hypotheses.
Figure 4A:
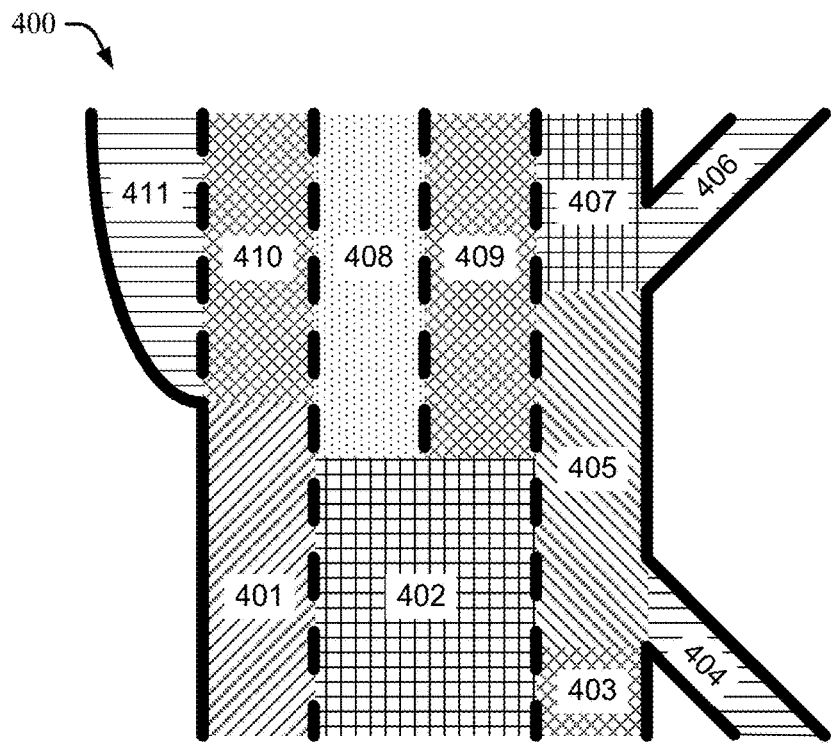
FIG. 4A illustrates an example set of lane sections defined by a lane section module of the road-perception system.
Figure 4B:
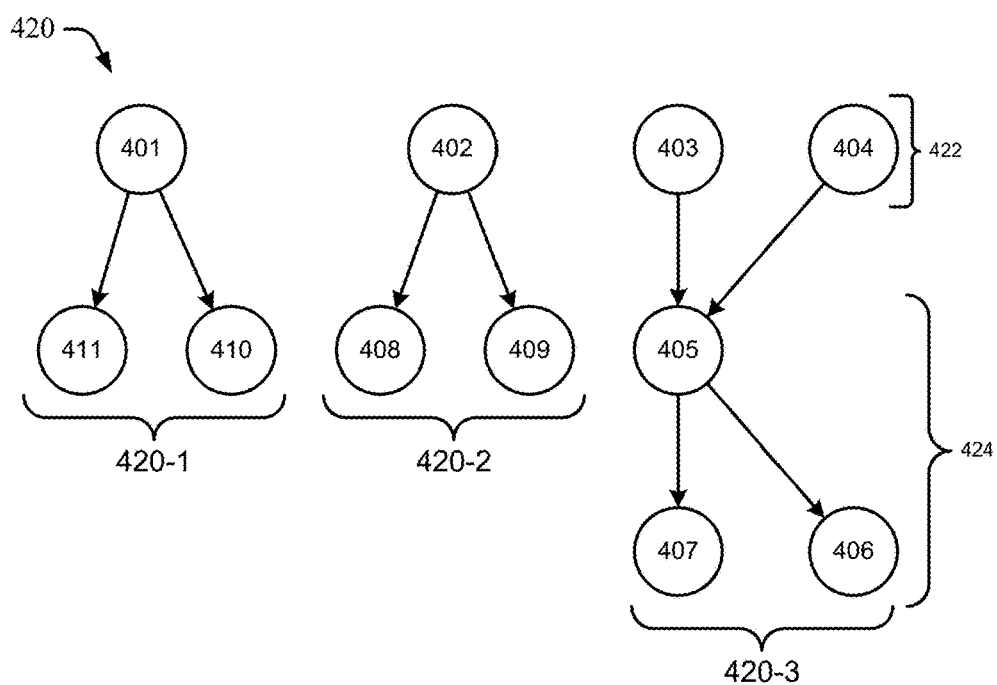
FIG. 4B illustrates example directed acyclic graphs generated by a lane section module to order the set of lane sections into parent nodes and child nodes.

This document describes operations of the lane discernment module 108 including the lane section module 206 and the section belief module 208 in greater detail with respect to FIGS. 3, 4A, and 4B. The operations of the FOD module 210, the lane belief module 212, and the lane plausibility module 214 to determine the belief parameter and the plausibility parameter associated with the lanes 120 are described in greater detail with respect to FIG. 5.

FIG. 3 illustrates an example flowchart 300 of the road-perception system 106 to define lane sections 304 and estimate belief masses 314 associated with the lane sections 304. The flowchart 300 illustrates example operations of the lane section module 206 and the section belief module 208 of FIG. 2. The lanes 120 of the road 118 include one or more lane sections 304, which represent lower-level building blocks of a lane 120. As an example, the lanes 120 include one or more contiguous lane sections 304.

At 302, the lane section module 206 can define the lane sections 304 from a map (e.g., a high-definition map included in the CRM 204 of the road-perception system or memory of the vehicle 102, a map retrieved from a map or navigation service in communication with the road-perception system 106, a map obtained from a mobile phone or other device communicatively coupled to the road-perception system 106) or track them using measurements from the sensors 104 of the vehicle 102. Measurements may be obtained from sensors located outside the vehicle 102 (e.g., embedded in a roadway, integrated in a sign or marker, on-board another vehicle located near the vehicle 102).

The lane section module 206 represents each lane section 304 and its shape as a basis band 306. The basis band 306 is a multivariate normal distribution over a set of points 322 with a width at the points 322. For example, a polyline 324 can be represented by the points 322 and a set of normal vectors 326 from the points 322. The basis band 306 defines a drivable section of the road 118 with the polyline 324, which represents a linear curve 320 of the lane section 304, as the centerline with equal margins on each side to define boundaries 328. A different polyline, G, can represent the boundaries of the lane section 304 as a set of offsets from the polyline 324, along the normal vectors 326.

As an example, the lane section module 206 can convert sensor measurements or map data into an observation vector z. The observation vector z can be a set of normal offsets, $\mu_{li}$, from a prior basis band 306, B, and their respective the lane widths, $\mu_{hi}$. These normal offsets, $\mu_{li}$, correspond to the points at which the basis band 306, B, intersects the observation vector z. The observation vector z is defined in Equation (1)

$$z = \{\mu_{l1}, \mu_{h1}, \mu_{l2}, \mu_{h2}, \ldots, \mu_{ln}, \mu_{hm}\} \quad (1)$$

The lane section module 206 can define a frame of discernment, $\Omega$, and its superset, $2^{\Omega}$, in terms of the lane sections 304, $l_i$, using Equations (2) and (3), respectively:

$$\Omega = \{l_1, l_2, \ldots l_n\} \text{ and} \quad (2)$$

$$2^{\Omega} = \{l_i, (l_i, l_j), (l_i, l_j, l_k), \ldots (l_i, l_j, l_k, \ldots, l_{(n-1)}), \Phi, \Omega\}, \quad (3)$$

where i=1, 2, 3, . . . n; j=1, 2, 3, . . . n; and k=1, 2, 3, . . . n.

At 308, the lane section module 206 topologically orders the lane sections 304 into a directed acyclic graph 310. The lane section module 206 adds newly-detected lane sections 304 as child nodes to parent nodes whose last basis points are within a Euclidean distance, $\delta_{link}$, of the first basis point. In situations where map data is available, the lane section module 206 can use the relationship between lanes 120 to build the directed acyclic graph 310. A search through the directed acyclic graph 310 may be used to insert lane sections 304 corresponding to unassociated observations in the same region as existing lane sections 304. For observations that extend beyond existing basis bands 306, the lane section module 206 can add a new lane section 304 as a child of the last lane section 304 for which the observation meets plausibility and association criteria. The directed acyclic graph 310 allows the lane section module 206 and the FOD module 210 to leverage graph-traversal methods that enable grouping lane sections 304 into lane hypotheses faster and allow refining the lane hypotheses based on additional data.

At 312, the section belief module 208 estimates, using a semantic descriptor function, a belief mass 314 associated with each lane section 304. The semantic descriptor function can be asymmetrical and leverage the uncertainty of each basis band 306 independently to define a distribution of belief in the lane section 304. In particular, the section belief module 208 can estimate the belief mass 314 using a basic belief assignment (BBA) function. The BBA function represents a belief mass 314 of any subset A of the superset $2_r^\Omega$. The BBA function is determined based on a prior determination of the BBA function and observation data.

The BBA function of any basis band 306, B, with mean $\mu$ and covariance $\Sigma$, can be represented by Equation (4):

$$m(B_t) = \eta r(z) m(z|B_{t-1}) m(B_{t-1}) \quad (4)$$

where $m(B_{t-1})$ represents the belief mass 314 assigned to the basis band 306, B, at the previous time step adjusted for the motion of the vehicle 102; $m(z|B_t)$ represents the belief in the association of observation z to the basis band 306, B; r(z) represents a confidence value associated with the analysis of sensor data used to define the respective lane section; and $\eta$ represents a normalization factor to ensure that the BBA function for the subsets (e.g., lane sections) in the superset $2_r^\Omega$ sum to one.

The association of observation z to the basis band B, $m(z|B_t)$, is computed using the following steps. Point observations, which can include, as non-limiting examples, trails, map points, and grid-cell coordinates, are transformed to the coordinate system of the road-perception system 106 and represented as observation vectors z. Polynomial observations are sampled to identify a representative set of points that are treated like point observations. The belief in a measurement $m(z|B_t)$, given the prior basis band 306, B, for the lane section 304, is computed using Equation (5):

$$m(z|B_t) = \frac{1}{3} + \alpha_0 e^{\left(-\frac{(d-d_0)^2}{2\sigma_{left}}\right)} + \alpha_0 e^{\left(-\frac{(d+d_0)^2}{2\sigma_{right}}\right)} + \alpha_1 e^{\left(-\frac{d^2}{2\sigma_{center}}\right)} \quad (5)$$

where d represents a Mahalanobis distance between the distributions corresponding to the basis band B and the observation vector z; $d_0$ represents one half of the expected lane width; $\alpha_0$ represents the relevance of a measurement to the lane boundary; $\alpha_1$ represents the relevance of a measurement to the lane center; $\sigma_{left}$ represents the variance of the left lane boundary; $\sigma_{right}$ represents the variance of the right lane boundary; and or $\sigma_{center}$ represents the variance of the centerline.

Considering a normal distribution of offset vectors g from the basis band 306, B, the section belief module 208 can represent the likelihood of any polyline in this distribution with Equation (6):

$$P_g(g, B_\kappa, \mu, \Sigma) = \frac{1}{(2\pi)^{\frac{n}{2}} |\Sigma|^{\frac{1}{2}}} e^{\left(-\frac{1}{2}(g^{B_\kappa}-\mu)^T \Sigma^{-1} (g^{B_\kappa}-\mu)\right)} \quad (6)$$

where $\mu$ represents the mean offset vector from the basis band 306, B, and $\Sigma$ represents its covariance. If the basis band 306, B, is set as the expectation of the basis band distribution, $\mu$ can be considered to equal zero.

FIG. 4A illustrates an example set of lane sections 400 defined by the lane section module 206 of the road-perception system 106. The set of lane sections 400 includes lane sections 401, 402, 403, 404, 405, 406, 407, 408, 409, 410, and 411. As described above, the lane section module 206 can use map data and/or sensor measurements to define the set of lane sections 400.

FIG. 4B illustrates example directed acyclic graphs 420 generated by the lane section module 206 to order the set of lane sections 400 into parent nodes 422 and child nodes 424. In this implementation, the lane section module 206 topologically orders the set of lane sections 400 into three directed acyclic graphs 420 (e.g., directed acyclic graphs 420-1, 420-2, and 420-3). The directed acyclic graphs 420 include one or more parent nodes 422 (e.g., the lane sections 401, 402, 403, 404, and 405) and respective child nodes 424 (e.g., the lane sections 405, 406, 407, 408, 409, 410, and 411).

In particular, the lane section module 206 generates the directed acyclic graph 420-1. The parent node 422 of the directed acyclic graph 420-1 is the lane section 401 with lane sections 410 and 411 as the child nodes 424.

The lane section module 206 generates the directed acyclic graph 420-2. The parent node 422 of the directed acyclic graph 420-2 is the lane section 402 with lane sections 408 and 409 as the child nodes 424.

The lane section module 206 also generates the directed acyclic graph 420-3. The parent nodes 422 of the directed acyclic graph 420-3 are the lane sections 403, 404, and 405 with lane sections 405, 406, and 407 as the child nodes 424. In particular, lane sections 406 and 407 are children of lane section 405, which is itself a child of lane sections 403 and 404.

The section belief model 208 can perform a consolidation step on the directed acyclic graph(s) 420 to combine adjacent nodes that do not branch. The consolidation step allows the section belief model 208 to reduce the number of nodes in the directed acyclic graphs 420, which can lower the computational complexity of the road model without losing any information regarding the road 118.

Figure 5:
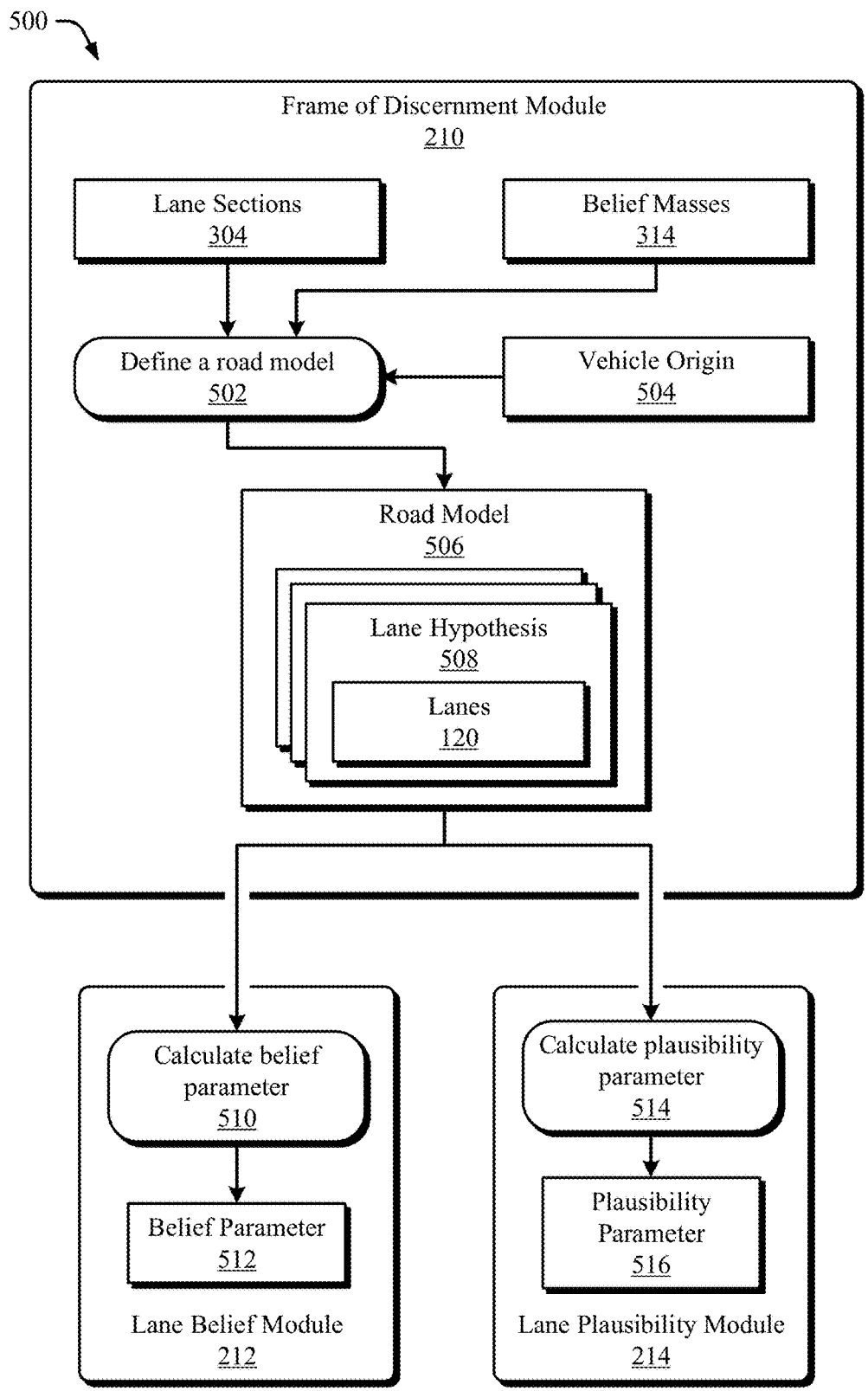
FIG. 5 illustrates an example flowchart of a road-perception system configured to estimate a belief parameter and a plausibility parameter associated with lanes of a road model.

FIG. 5 illustrates an example flowchart 500 of the road-perception system 106 to estimate a belief parameter 512 and a plausibility parameter 516 associated with the lanes 120 of a road model 506. The flowchart 500 illustrates example operations and outputs of the FOD module 210, the lane belief module 212, and the lane plausibility module 214 of FIG. 2.

At 502, the FOD module 210 defines the road model 506 for the road 118 in a frame of discernment. The frame of discernment, $\Omega$, defines the road 118 as a set of proposed lanes 120 in a road-fixed coordinate system. The FOD module 210 sets the origin of the coordinate system as a vehicle origin 504 at ignition. The frame of discernment, $\Omega$, considers each lane 120 as independent of the other lanes 120, which facilitates tracking the lanes 120 in lower-dimensional state space. The frame of discernment includes lane sections 304 and a superset of the lane sections, $2^\Omega$.

The lanes 120, $L_i$, are subsets of the superset of the lanes, $2^\Omega$, that satisfy criteria for a definition of a lane, as described below. The FOD module 210 can consolidate the lane sections 304, based on the directed acyclic graph 310, into the lanes 120, $L_i$. The FOD module 210 can also group the lane sections 304 together into one or more lane hypotheses 508, which each include a reduced superset, $2_r^\Omega$, of the superset of the lane sections 304, $2^\Omega$. The reduced superset, $2_r^\Omega$, represents a realizable combination of the lane sections 304 in the frame of discernment. The reduced superset, $2_r^\Omega$, is a set of contiguous lane sections 304, each of which describes all or part of a lane 120. Each subset in the reduced superset, $2_r^\Omega$, comprises one or more basis bands 306. The reduced superset, $2_r^\Omega$, is defined in Equation (7):

$$2_r^\Omega = \{L_i, \Phi, \Omega\}, \quad (7)$$

where i=1, 2, 3, . . . n and $L_i$ is any connected set of lane sections 304.

With the belief mass 314, $m(B_j)$, associated with the lane sections 304, the FOD module 210 can consolidate the lane sections 304 into the road model 506 using a Rule Combination of the Dempster Shafer Theorem.

To use the Dempster Shafer Rule Combination, the FOD module 210 can compute the belief in non-singleton sets, utilizing definitions of A, B, and A∩B. A and B denote the pairwise combinations of all subsets in the reduced superset $2_r^\Omega$. A∩B=A represents the basis 306 bands that have at least one point in the basis bands 306 that represent them and are within a radial distance delta of each other. In other words, A∩B=A represents the basis bands 306 that have close proximity to each other in space. A∩B=ϕ represents pairs of basis bands 306 that do not have close proximity to each other in space.

The FOD module 210 consolidates the lane sections 304 into a set of proposed lanes 120 by determining the BBA functions that satisfy the following properties per the Dempster Shafer Theorem as expressed in Equation (8):

$$m(A) = \frac{1}{1-k} \sum_{A_i \cap B_j = A} m_1(A_i) m_2(B_j) \quad (8)$$

where $m(\phi) = 0$, $$\sum_{A \in 2^\Omega} m(A) = 1,$$

$A \neq 0$, and $$k = \sum_{A_i \cap B_j = \phi} m_1(A_i) m_2(B_j).$$

At 510, the lane belief module 212 calculates the belief parameter 512 associated with the lanes 120. The lane belief module 212 can also calculate the overall belief parameter in a lane hypothesis 508. The overall belief parameter in a lane hypothesis 508 is the sum of the BBA functions within the subset, according to Equation (9):

$$Bel(A) = \sum_{B \subseteq A} m(B), \quad (9)$$

where B is a subset of A. The belief parameter 512 of a lane 120 represents confidence in the shape of the lane sections 304 therein and the likelihood that these lane sections 304 are connected.

At 514, the lane plausibility module 214 calculates the plausibility parameter 516 associated with the lanes 120. In some implementations, some lane sections 304, or some sets of lane sections 304 in the reduced superset $2_r^\Omega$ are shared across different lanes 120. Two lane sections 304 that share a parent node are indirectly connected, and the plausibility parameter 516 can indicate that there is some additional belief in the existence of a lane 120 based on the fact that there exists another lane 120 that shares an origin. The plausibility parameter 516 is an indication of how likely the lane 120 is to exist because it takes into account the belief mass 314 of each of the lane sections 304 that are subsets or intersecting sets. The belief parameter 512 can be synonymous with lane confidence, and the plausibility parameter 516 can be treated as the probability of the existence of the lane 120. The belief parameter 512 and the plausibility parameter 516 can provide a lower-bound and an upper-bound for the likelihood of a lane hypothesis 508 being true. The uncertainty module 110 also determines the difference between the plausibility parameter 516 and the belief parameter 512, which represents the ignorance of the road-perception system 106 in the road model 506.

Figure 6:
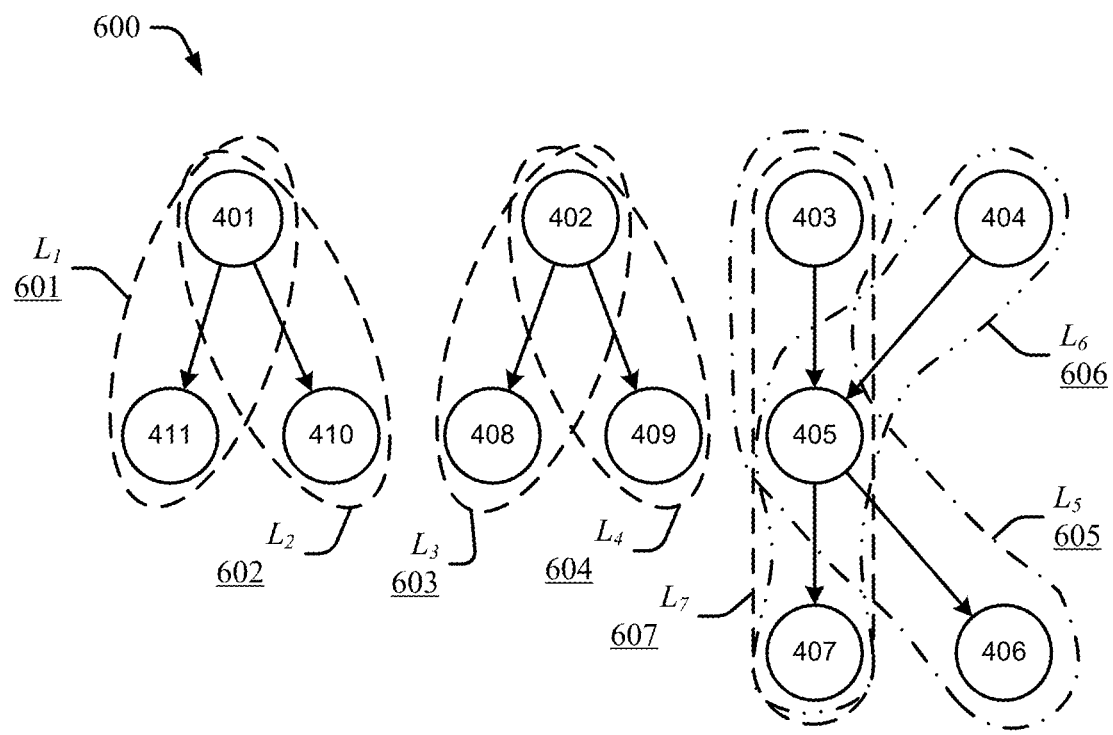
FIG. 6 illustrates an example consolidation of lane sections into a set of proposed lanes.

FIG. 6 illustrates an example consolidation of lane sections 400 into a set of proposed lanes 600. The lane sections 400 represent the lane sections 400 of FIGS. 4A and 4B. The lane section module 206 builds the directed acyclic graphs 420 that include the lane sections 401, 402, 403, 404, 405, 406, 407, 408, 409, 410, and 411 and their relationships, as illustrated in FIG. 4B. The section belief module 208 then computes the belief masses, $m(l_i)$, for the lane sections 401 through 411. The FOD module 210 then traverses the directed acyclic graphs 420 to identify all unique paths from the root of a directed acyclic graph 420 to its leaves.

The FOD module 210 then applies the Rule Combination of the Dempster Shafer Theorem according to Equation (8), to consolidate the lane sections 400 into the lanes 600. In particular, the FOD module 210 consolidates lane sections 401 and 411 into lane 601 ($L_1$); lane sections 401 and 410 into lane 602 ($L_2$); lane sections 402 and 408 into lane 603 ($L_3$); lane sections 402 and 409 into lane 604 ($L_4$); lane sections 403, 405, and 406 into lane 605 ($L_5$); lane sections 404, 405, and 407 into lane 606 ($L_6$); and lane sections 403, 405, and 407 into lane 607 ($L_7$).

The lane belief module 212 can then use the belief masses 314, $m(l_i)$ to determine a belief parameter 512 for the lanes 600. The belief parameter 512 for the lanes 600 is computed as follows:

$$L_1 = \{l_1, l_{11}\}; \quad (L5)$$

$$Bel(L_1) = m(l_1) + m(l_{11}) + m(l_1)m(l_{11});$$

$$L_2 = \{l_1, l_{10}\};$$

$$Bel(L_2) = m(l_1) + m(l_{10}) + m(l_1)m(l_{10});$$

$$L_3 = \{l_2, l_8\}$$

$$Bel(L_3) = m(l_2) + m(l_8) + m(l_2)m(l_8);$$

$$L_4 = \{l_2, l_9\}$$

$$Bel(L_4) = m(l_2) + m(l_9) + m(l_2)m(l_9);$$

$$L_5 = \{l_3, l_5, l_6\}$$

$$Bel(L_5) = m(l_3) + m(l_5) + m(l_6) + m(l_3)m(l_5) + m(l_5)m(l_6) + \frac{m(l_3)m(l_5) + m(l_5)m(l_6)}{1 - m(l_3)m(l_6)};$$

$$L_6 = \{l_4, l_5, l_7\}$$

$$Bel(L_6) = m(l_4) + m(l_5) + m(l_7) + m(l_4)m(l_5) + m(l_5)m(l_7) + \frac{m(l_4)m(l_5) + m(l_5)m(l_7)}{1 - m(l_4)m(l_7)};$$

$$L_7 = \{l_3, l_5, l_7\}$$

$$Bel(L_7) = m(l_3) + m(l_5) + m(l_7) + m(l_3)m(l_5) + m(l_5)m(l_7) + \frac{m(l_3)m(l_5) + m(l_5)m(l_7)}{1 - m(l_3)m(l_7)}.$$

The lane plausibility module 214 then adds the belief masses 314 of the lane sections 304 shared across lanes 600 to the respective belief parameter 512 to compute the plausibility parameter 516 of the lanes 600:

$$Pl(L_1)=Bel(L_1)+m(l_{10});$$

$$Pl(L_2)=Bel(L_2)+m(l_{11});$$

$$Pl(L_3)=Bel(L_3)+m(l_9);$$

$$Pl(L_4)=Bel(L_4)+m(l_8);$$

$$Pl(L_5)=Bel(L_5)+m(l_4)+m(l_7);$$

$$Pl(L_6)=Bel(L_6)+m(l_3)+m(l_6); \text{ and}$$

$$Pl(L_7)=Bel(L_7)+m(l_4)+m(l_6).$$

Example Method

Figure 7:
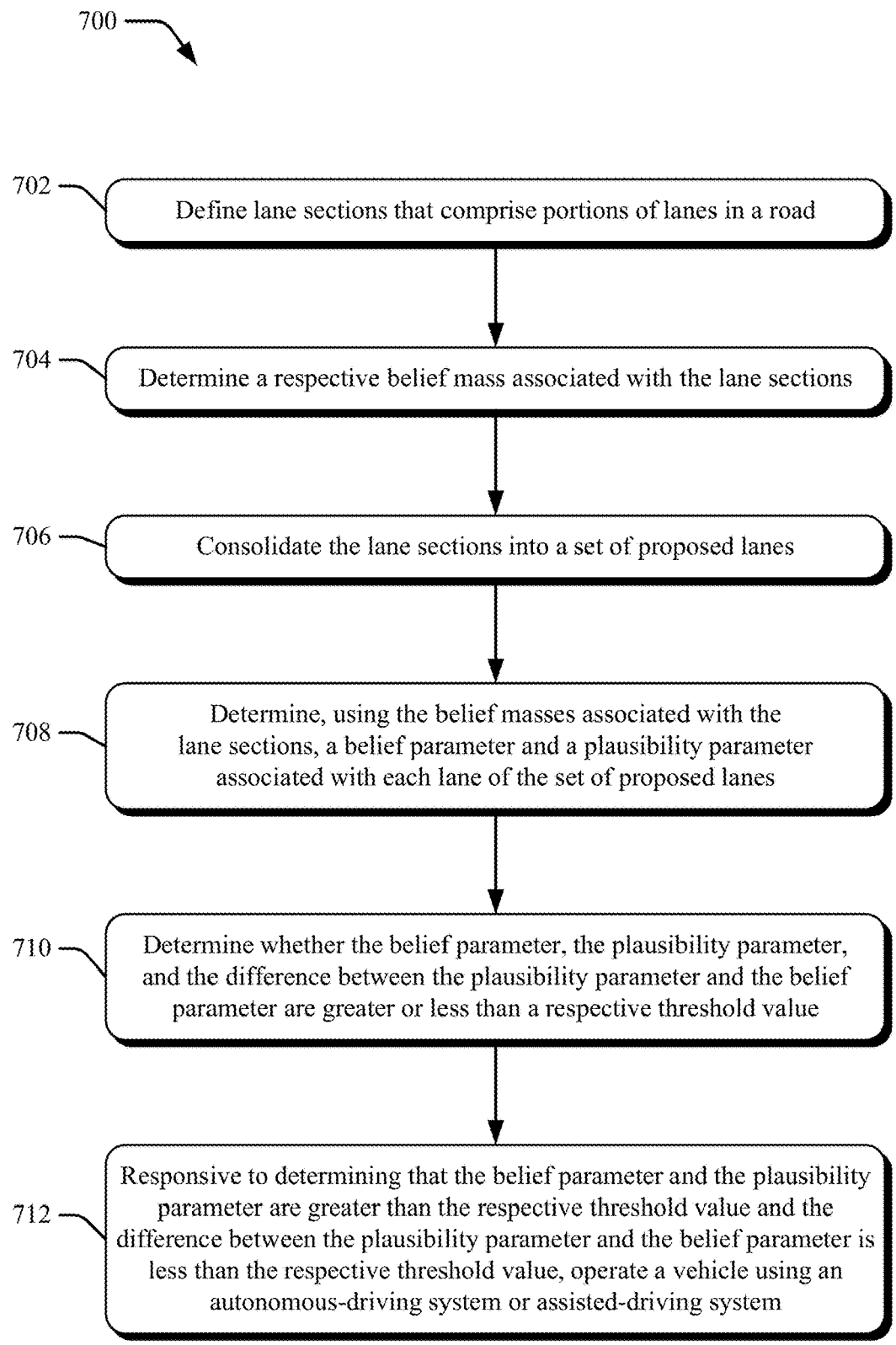
FIG. 7 illustrates an example method of a road-perception system configured to estimate a belief parameter and a plausibility parameter of lanes in a road model.

FIG. 7 depicts an example method 700 of a road-perception system to estimate the belief parameter 512 and the plausibility parameter 516 of the lanes 120. Method 700 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the road-perception system 106 of FIGS. 1 through 6 and entities detailed therein, reference to which is made for example only. The techniques are not limited to performance by one entity or multiple entities.

At 702, lane sections that comprise portions of lanes in a road are defined. The lane sections are represented by respective basis bands that include points of a polyline and a width at each point. For example, the road-perception system 106 can define lane sections 304 that comprise portions of the lanes 120 in the road 118. The lane sections 304 are represented by the basis bands 306, which include the points 322 of the polyline 324 and the normal vectors 326, which represent width of the lane section 304, at each point 322. The road-perception system 106 can topologically order the lane sections 304 into a directed acyclic graph 310.

At 704, a respective belief mass associated with the lane sections is determined. For example, the road-perception system 106 can determine, using a semantic descriptor function, the belief masses 314 associated with the lane sections 304.

At 706, the lane sections are consolidated into a set of proposed lanes. For example, the road-perception system 106 can consolidate the lane sections 304 into a set of proposed lanes. In some implementations, the lane sections 304 can be consolidated, using the directed acyclic graph 310, into multiple lane hypotheses 508.

At 708, a belief parameter and a plausibility parameter associated with each lane of the set of proposed lanes are determined. The belief parameter and the plausibility parameter are determined using the belief masses associated with the lane sections. For example, the road-perception system 106 can determine, using the belief masses 314 associated with the lane sections 304, the belief parameter 512 and the plausibility parameter 516 associated with each lane 120.

At 710, it is determined whether the belief parameter, the plausibility parameter, and the difference between the plausibility and belief parameters associated with each lane of the set of proposed lanes are greater or less than a respective threshold value. For example, the road-perception system 106 can determine whether the belief parameter 512, the plausibility parameter 516, and the difference between the plausibility parameter 516 and belief parameter 512 associated with the lanes 120 for one lane hypothesis 508 are greater or less than a respective threshold value.

At 712, responsive to determining that the belief parameter and the plausibility parameter are greater than the respective threshold value and the difference between the plausibility parameter and the belief parameter is less than the respective threshold value, a vehicle is operated using an autonomous-driving system or an assisted-driving system. The autonomous-driving system or the assisted-driving system operates the vehicle using the set of proposed lanes. For example, responsive to determining that the belief parameter 512 and the plausibility parameter 516 are greater than the respective threshold value and the difference between the plausibility parameter 516 and the belief parameter 512 is less than the respective threshold value, the vehicle 102 can be operated using the autonomous-driving system 116 or the assisted-driving system 114. The autonomous-driving system 116 or the assisted-driving system 114 can operate the vehicle 102 using the set of proposed lanes 120. Alternatively, the road-perception system 106, responsive to determining that at least one of the belief parameter 512 or the plausibility parameter 516 is less than the respective threshold value or the difference between the plausibility parameter 516 and the belief parameter 512 is greater than the respective threshold value, can discontinue an operation of the vehicle with the autonomous-driving system 116 or the assisted-driving system 114 and switch the operation of the vehicle 102 to control by a driver.

EXAMPLES

In the following section, examples are provided.

Example 1: A method comprising: defining, by a road-perception system of a vehicle, lane sections that comprise portions of lanes in a road, the lane sections represented by respective basis bands that include points of a polyline and a width at the points of the polyline; determining, by the road-perception system, respective belief masses associated with the lane sections; consolidating, by the road-perception system, the lane sections into a set of proposed lanes; determining, by the road-perception system and using the respective belief masses associated with the lane sections, a belief parameter and a plausibility parameter associated with each lane of the set of proposed lanes; determining whether the belief parameter, the plausibility parameter, and the difference between the plausibility parameter and the belief parameter associated with each lane of the set of proposed lanes are each greater or less than a respective threshold value; and responsive to determining that the belief parameter and the plausibility parameter are each greater than the respective threshold value and the difference between the plausibility parameter and the belief parameter is less than the respective threshold value, operating, using the set of proposed lanes, the vehicle with an autonomous-driving system or an assisted-driving system.

Example 2: The method of example 1, the method further comprising: determining the belief masses associated with the lane sections using a semantic descriptor function.

Example 3: The method of example 1, the method further comprising: determining, based on a prior determination of the belief masses and observation data, the belief masses associated with the lane sections.

Example 4: The method of example 3, wherein the belief masses represent a product of: a normalization factor that is set to ensure the belief masses associated with the lane sections sum up to one; a confidence value associated with data used to define a respective lane section; the prior determination of the belief masses; and another belief mass representing a belief in associating the data used to define the respective lane section to the respective basis band.

Example 5: The method of example 1, wherein consolidating the lane sections into the set of proposed lanes comprises determining the set of proposed lanes that satisfy properties of a Dempster Shafer Theorem and Dempster Shafer Rule Combination.

Example 6: The method of example 1, wherein consolidating the lane sections into the set of proposed lanes comprises: consolidating the lane sections into multiple lane hypotheses, each lane hypothesis including a respective set of proposed lanes that is different than a respective set of proposed lanes for another lane hypothesis.

Example 7: The method of example 6, the method further comprising: determining, by summing the belief parameter associated with each lane of a respective lane hypothesis, an overall belief parameter for the respective lane hypothesis.

Example 8: The method of example 1, wherein defining the lane sections comprises defining the lane section using at least one of map data or sensor measurements.

Example 9: The method of example 1, wherein the polyline of the respective basis bands represents a center of a respective lane section, and the width represents a lane width of the respective lane section in the normal direction of the polyline at each point in the polyline.

Example 10: The method of example 1, the method further comprising: maintaining the lane sections in a directed acyclic graph.

Example 11: The method of example 1, wherein each lane of the set of proposed lanes represents at least one contiguous lane section.

Example 12: The method of example 11, the method further comprising: adding a newly-detected lane section as a child node of a parent node, the parent node comprising a lane section among the lane sections.

Example 13: The method of example 1, the method further comprising: responsive to determining that at least one of the belief parameter or the plausibility parameter are less than the respective threshold value or that the difference between the plausibility parameter and the belief parameter is greater than the respective threshold value results in discontinuing an operation of the vehicle with the autonomous-driving system or the assisted-driving system.

Example 14: The method of example 1, the method further comprising: responsive to determining that at least one of the belief parameter or the plausibility parameter are less than the respective threshold value or that the difference between the plausibility parameter and the belief parameter is greater than the respective threshold value results in switching the operation of the vehicle to control by a driver.

Example 15: The method of example 1, wherein the autonomous-driving system or the assisted-driving system comprises at least one of an automatic cruise control system, a traffic-jam assist system, a lane-centering assist system, or an L3/L4 autonomous driving on highways system.

Example 16: A computer-readable storage media comprising computer-executable instructions that, when executed, cause a processor of a computing device to: define lane sections that comprise portions of lanes in a road on which a vehicle is driving, the lane sections represented by respective basis bands that include points of a polyline and a width at the points of the polyline; determine respective belief masses associated with the lane sections; consolidate the lane sections into a set of proposed lanes; determine, using the respective belief masses associated with the lane sections, a belief parameter and a plausibility parameter associated with each lane of the set of proposed lanes; determine whether the belief parameter, the plausibility parameter, and the difference between the plausibility parameter and the belief parameter associated with each lane of the set of proposed lanes are each greater or less than a respective threshold value; and responsive to a determination that the belief parameter and the plausibility parameter are each greater than the respective threshold value and the difference between the plausibility parameter and the belief parameter is less than the respective threshold value, operate, using the set of proposed lanes, the vehicle with an autonomous-driving system or an assisted-driving system.

Example 17: The computer-readable storage media of example 16, wherein the computer-executable instructions, when executed, further cause the processor of the computing device to: determine, based on a prior determination of the belief masses and observation data, the belief masses associated with the lane sections using a semantic descriptor function.

Example 18: The computer-readable storage media of example 17, wherein the belief masses represent a product of: a normalization factor that is set to ensure that the belief masses associated with the lane sections sum up to one; a confidence value associated with data used to define a respective lane section; the prior determination of the belief masses; and another belief mass representing a belief in associating the data used to define the respective lane section to the respective basis band.

Example 19: The computer-readable storage media of example 16, wherein, in consolidating the lane sections into the set of proposed lanes, the computer-executable instructions cause the processor of the computing device to consolidate the lane sections into multiple lane hypotheses, each lane hypothesis including a respective set of proposed lanes different than a respective set of proposed lanes for another lane hypothesis.

Example 20: The computer-readable storage media of example 16, wherein the computer-executable instructions, when executed, further cause the processor of the computing device to maintain the lane sections in a directed acyclic graph.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:
1. A method comprising:
defining, by a road-perception system of a vehicle and using at least one of map data or sensor measurements, multiple lane sections that comprise portions of lanes of a roadway, the lane sections being represented by respective basis bands that include points of a polyline and a width at the points of the polyline, each lane of the roadway including one or more contiguous lane sections;

for each respective lane section of the multiple lane sections, determining, by the road-perception system, respective belief masses associated with the respective lane section being assigned to respective lanes of the roadway;
consolidating, by the road-perception system, the multiple lane sections into a set of proposed lanes representing the roadway in a road model;
determining, by the road-perception system and using the respective belief masses associated with the multiple lane sections, a belief parameter and a plausibility parameter associated with each lane of the set of proposed lanes, the belief parameter being determined as a first sum of mass values associated with respective lane sections consolidated into a respective lane of the set of proposed lanes, the plausibility parameter being determined as a second sum of the first sum and mass values associated with other lane sections that share a parent lane section with the respective lane;
determining whether the belief parameter, the plausibility parameter, and the difference between the plausibility parameter and the belief parameter associated with each lane of the set of proposed lanes are each greater or less than a respective threshold value; and
responsive to determining that the belief parameter and the plausibility parameter are each greater than the respective threshold value and the difference between the plausibility parameter and the belief parameter is less than the respective threshold value, operating, using the set of proposed lanes of the road model, the vehicle along the roadway with an autonomous-driving system or an assisted-driving system.

2. The method of claim 1, wherein
belief masses are determined using a semantic descriptor function.

3. The method of claim 1, wherein
the belief masses are determined based on a prior determination of the belief masses and the sensor measurements.

4. The method of claim 3, wherein the belief masses represent a product of:
a normalization factor that is set to ensure that the belief masses associated with the lane sections sum to one;
a confidence value associated with the map data or the sensor measurements used to define a respective lane section;
the prior determination of the belief masses; and
another belief mass representing a belief in associating the map data or the sensor measurements used to define the respective lane section to the respective basis band.

5. The method of claim 1, wherein consolidating the multiple lane sections into the set of proposed lanes comprises determining the set of proposed lanes that satisfy properties of a Dempster Shafer Theorem and Dempster Shafer Rule Combination.

6. The method of claim 1, wherein consolidating the multiple lane sections into the set of proposed lanes comprises:
consolidating the multiple lane sections into multiple lane hypotheses, each lane hypothesis including a respective set of proposed lanes that is different than a respective set of proposed lanes for another lane hypothesis.

7. The method of claim 6, the method further comprising:
determining, by summing the belief parameter associated with each lane of a respective lane hypothesis, an overall belief parameter for the respective lane hypothesis.

8. The method of claim 1, wherein defining the multiple lane sections comprises defining the multiple lane sections using both the map data and the sensor measurements.

9. The method of claim 1, wherein the polyline of the respective basis bands represents a center of a respective lane section, and the width represents a lane width of the respective lane section in the normal direction of the polyline at each point in the polyline.

10. The method of claim 1, the method further comprising:
maintaining the multiple lane sections in a directed acyclic graph.

11. The method of claim 1, wherein each lane of the set of proposed lanes represents at least one contiguous lane section.

12. The method of claim 11, the method further comprising:
adding a newly-detected lane section as a child node of a parent node, the parent node comprising a lane section among the multiple lane sections.

13. The method of claim 1, the method further comprising:
responsive to determining that at least one of the belief parameter or the plausibility parameter are less than the respective threshold value or that the difference between the plausibility parameter and the belief parameter is greater than the respective threshold value, discontinuing operation of the vehicle with the autonomous-driving system or the assisted-driving system.

14. The method of claim 1, the method further comprising:
responsive to determining that at least one of the belief parameter or the plausibility parameter are less than the respective threshold value or that the difference between the plausibility parameter and the belief parameter is greater than the respective threshold value, switching operation of the vehicle to control by a driver.

15. The method of claim 1, wherein the autonomous-driving system or the assisted-driving system comprises at least one of an automatic cruise control system, a traffic jam assist system, a lane-centering assist system, or an L3/L4 autonomous driving on highways system.

16. A computer-readable storage media comprising computer-executable instructions that, when executed, cause a processor of a computing device to:
define, using at least one of map data or sensor measurements, multiple lane sections that comprise portions of lanes of a roadway on which a vehicle is driving, the lane sections being represented by respective basis bands that include points of a polyline and a width at the points of the polyline, each lane of the roadway including one or more contiguous lane sections;
for each respective lane section of the multiple lane sections, determine respective belief masses associated with the respective lane section being assigned to respective lanes of the roadway;
consolidate the multiple lane sections into a set of proposed lanes representing the roadway in a road model;
determine, using the respective belief masses associated with the multiple lane sections, a belief parameter and a plausibility parameter associated with each lane of the set of proposed lanes, the belief parameter being determined as a first sum of mass values associated with respective lane sections consolidated into a respective lane of the set of proposed lanes, the plausibility parameter being determined as a second sum of the first sum and mass values associated with other lane sections that share a parent lane section with the respective lane;

determine whether the belief parameter, the plausibility parameter, and the difference between the plausibility parameter and the belief parameter associated with each lane of the set of proposed lanes are each greater or less than a respective threshold value; and responsive to a determination that the belief parameter and the plausibility parameter are each greater than the respective threshold value and the difference between the plausibility parameter and the belief parameter is less than the respective threshold value, operate, using the set of proposed lanes of the road model, the vehicle along the roadway with an autonomous-driving system or an assisted-driving system.

17. The computer-readable storage media of claim 16, wherein the belief masses are determined using a semantic descriptor function.

18. The computer-readable storage media of claim 17, wherein the belief masses represent a product of:
- a normalization factor that is set to ensure that the belief masses associated with the lane sections sum to one;
- a confidence value associated with the map data or the sensor measurements used to define a respective lane section;
- the prior determination of the belief masses; and
- another belief mass representing a belief in associating the map data or the sensor measurements used to define the respective lane section to the respective basis band.

19. The computer-readable storage media of claim 16, wherein, in consolidating the lane sections into the set of proposed lanes, the computer-executable instructions cause the processor of the computing device to consolidate the multiple lane sections into multiple lane hypotheses, each lane hypothesis including a respective set of proposed lanes different than a respective set of proposed lanes for another lane hypothesis.

20. The computer-readable storage media of claim 16, wherein the computer-executable instructions, when executed, further cause the processor of the computing device to maintain the multiple lane sections in a directed acyclic graph.

\* \* \* \* \*